(12) United States Patent
Young et al.

(10) Patent No.: US 11,232,351 B2
(45) Date of Patent: *Jan. 25, 2022

(54) PERFORMING AVERAGE POOLING IN HARDWARE

(71) Applicant: Google LLC, Mountain View, CA (US)

(72) Inventors: Reginald Clifford Young, Palo Alto, CA (US); William John Gulland, Novato, CA (US)

(73) Assignee: Google LLC, Mountain View, CA (US)

( * ) Notice: Subject to any disclaimer, the term of this patent is extended or adjusted under 35 U.S.C. 154(b) by 870 days.

This patent is subject to a terminal disclaimer.

(21) Appl. No.: 16/011,454

(22) Filed: Jun. 18, 2018

(65) Prior Publication Data

US 2018/0300628 A1 Oct. 18, 2018

Related U.S. Application Data

(63) Continuation of application No. 15/467,294, filed on Mar. 23, 2017, now Pat. No. 10,037,490, which is a
(Continued)

(51) Int. Cl.
*G06N 3/08* (2006.01)
*G06N 3/04* (2006.01)
(Continued)

(52) U.S. Cl.
CPC ............. *G06N 3/08* (2013.01); *G06N 3/0454* (2013.01); *G06N 3/063* (2013.01); *G06N 5/04* (2013.01)

(58) Field of Classification Search
CPC .......... G06N 3/08; G06N 5/04; G06N 3/0635; G06N 3/04; G06N 3/0454; G06N 3/063; G06F 7/483; G06F 7/52; G06F 17/16
(Continued)

(56) References Cited

U.S. PATENT DOCUMENTS 6,389,441 B1  5/2002 Archer et al.
7,557,842 B2  7/2009 Ohara et al.
(Continued)

FOREIGN PATENT DOCUMENTS

CN  105488656 A  4/2016
JP  H06-164905  6/1994
(Continued)

OTHER PUBLICATIONS

Irish Search Report issued in Application No. 2018/0231, dated Nov. 14, 2018, 6 pages.
(Continued)

*Primary Examiner* — Dave Misir
(74) *Attorney, Agent, or Firm* — Fish & Richardson P.C.

(57) ABSTRACT

Methods and systems for receiving a request to implement a neural network comprising an average pooling layer on a hardware circuit, and in response, generating instructions that when executed by the hardware circuit, cause the hardware circuit to, during processing of a network input by the neural network, generate a layer output tensor that is equivalent to an output of the average pooling neural network layer by performing a convolution of an input tensor to the average pooling neural network layer and a kernel with a size equal to a window of the average pooling neural network layer and composed of elements that are each an identity matrix to generate a first tensor, and performing operations to cause each element of the first tensor to be divided by a number of elements in the window of the average pooling neural network layer to generate an initial output tensor.

17 Claims, 9 Drawing Sheets

Related U.S. Application Data continuation of application No. 15/377,196, filed on Dec. 13, 2016, now Pat. No. 10,032,110.

(51) Int. Cl.
  *G06N 3/063* (2006.01)
  *G06N 5/04* (2006.01)
(58) Field of Classification Search
  USPC .......................................................... 706/17
  See application file for complete search history.

(56) References Cited

U.S. PATENT DOCUMENTS

| | | | |
|---|---|---|---|
| 8,208,754 | B2 | 6/2012 | Lee |
| 8,300,057 | B2 | 10/2012 | Smith et al. |
| 9,208,778 | B2 | 12/2015 | Chopra et al. |
| 9,330,332 | B2 | 5/2016 | Natarajan et al. |
| 9,424,492 | B2 | 8/2016 | Murray et al. |
| 9,600,763 | B1 * | 3/2017 | Kasagi .................. G06N 3/08 |
| 2012/0303932 | A1 | 11/2012 | Farabet et al. |
| 2015/0104102 | A1 | 4/2015 | Carreira et al. |
| 2015/0170021 | A1 * | 6/2015 | Lupon ................ G06N 3/0454 706/15 |
| 2014/0844738 | | 9/2015 | Ross et al. |
| 2016/0342889 | A1 * | 11/2016 | Thorson ............. G06N 3/0481 |
| 2016/0342893 | A1 * | 11/2016 | Ross .................... G06F 17/153 |
| 2016/0358069 | A1 * | 12/2016 | Brothers .............. G06F 7/764 |
| 2017/0011280 | A1 * | 1/2017 | Soldevila ............ G06K 9/6214 |
| 2017/0091613 | A1 * | 3/2017 | Ito ......................... G06N 3/02 |
| 2017/0102921 | A1 * | 4/2017 | Henry .................. G06N 3/063 |
| 2017/0103301 | A1 * | 4/2017 | Henry .................. G06F 9/321 |
| 2017/0103302 | A1 * | 4/2017 | Henry .................. G06N 3/088 |
| 2017/0132496 | A1 * | 5/2017 | Shoaib ................. G06N 3/063 |
| 2017/0316307 | A1 * | 11/2017 | Koster .................. G06F 7/00 |

FOREIGN PATENT DOCUMENTS

| | | |
|---|---|---|
| JP | 2009-230494 | 10/2009 |
| JP | 2013-200778 | 10/2013 |
| WO | 2016/033710 | 3/2016 |
| WO | WO 2016/033710 | 3/2016 |
| WO | WO 2016/186801 | 11/2016 |
| WO | WO 2016/186813 | 11/2016 |
| WO | WO 2016/186823 | 11/2016 |
| WO | WO 2018/111357 | 6/2018 |

OTHER PUBLICATIONS

GB Examination Report in Great Britain Application No. GB1715180, dated Nov. 29, 2019, 8 pages.

Irish Search Report in Application No. 2019/0119, dated Sep. 18, 2019, 6 pages.

'maltabtricks.com' [online] "Moving average by convolution," Sep. 29, 2013 [retrieved on Feb. 7, 2018] Retrieved from Internet: URL<http://maltabtricks.com/post-11/moving-average-by-convolution> 3 pages.

'www.cs.auckland.ac.nz' [online] "Image Filtering," May 25, 2010, [retrieved on Nov. 8, 2017] Retrieved from Internet: URL<https://www.cs.auckland.ac.nz/courses/compsci373s1c/PatricesLectures/Image%20Filtering_1up.pdf > 8 pages.

'www.cs.toronto.edu' [online] "Computer Vision: Filtering," Urtasun, R. Lecture Presentation, Jan. 10, 2013 [retrieved on Feb. 7, 2018] Retrieved from Internet: URL<http://www.cs.toronto.edu/~Urtasun/courses/CV/lecture02.pdf> 137 pages.

British Search Report issued in Application No. GB1715180.4, dated Mar. 8, 2018, 11 pages.

Chen et al. "DianNao: A Small-Footprint High-Throughput Accelerator for Ubiquitous Machine Learning," ACM Sigplan Notices vol. 49(4), Mar. 1, 2014, 15 pages.

Du et al. "A Reconfigurable Streaming Deep Convolutional Neural Network Accelerator for Internet of Things," arXiv 1707.02973, Jul. 2017, 10 pages.

Du et al. "ShiDianNao," Proceedings of the $42^{nd}$ Annual International Symposium on Computer Architecture, Jan. 1, 2015, 13 pages.

International Search Report and Written Opinion issued in International Application No. PCT/US2017/048017, dated Nov. 20, 2017, 17 pages.

Irish Search Report issued in Application No. 2017/0187, dated Feb. 22, 2018, 9 pages.

Office Action and Search Report issued in Singaporean Application No. 10201707701P dated Apr. 26, 2018, 10 pages (English Translation).

JP Office Action in Japanese Application No. 2019-531384, dated Jan. 12, 2021, 8 pages (with English translation).

U.S. Appl. No. 14/844,738, filed Sep. 3, 2015, Ross et al.

IN Office Action in Indian Application No. 201947026851, dated May 7, 2021, 8 pages (with English translation).

* cited by examiner (a)

Zero-Padded Input Tensor · Pooling Kernel · Summed Output Tensor

FIG. 9

PERFORMING AVERAGE POOLING IN HARDWARE

CROSS REFERENCE TO RELATED APPLICATIONS

This application is a continuation of U.S. patent application Ser. No. 15/467,294, filed on Mar. 23, 2017, which is a continuation of U.S. patent application Ser. No. 15/377,196, filed on Dec. 13, 2016. The prior applications are incorporated herein by reference in their entirety.

BACKGROUND

This specification relates to computing neural network inferences in hardware.

Neural networks are machine learning models that employ one or more layers to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, this specification describes a special-purpose hardware circuit that computes neural network inferences.

In general, one innovative aspect of the subject matter described in this specification includes systems and methods for receiving a request to process a neural network on a hardware circuit, the neural network comprising an average pooling neural network layer, and in response, generating instructions that when executed by the hardware circuit, cause the hardware circuit to, during processing of a network input by the neural network, generate a layer output tensor that is equivalent to an output of the average pooling neural network layer by performing operations comprising: performing a convolution of an input tensor to the average pooling neural network layer and a kernel with a size equal to a window of the average pooling neural network layer and composed of elements that are each an identity matrix to generate a first tensor, and performing operations to cause each element of the first tensor to be divided by a number of elements in the window of the average pooling neural network layer to generate an initial output tensor.

Implementations can include one or more of the following features. In some implementations, innovative aspects of the subject matter include rescaling edge elements of the initial output tensor by a first scaling factor and rescaling corner elements of the initial output tensor by a second scaling factor to generate an output tensor. The first scaling factor is based on a number of elements of the input tensor that are multiplied with elements of the kernel in performing the convolution to generate an edge element of the first tensor, and the second scaling factor is based on a number of elements of the input tensor that are multiplied with elements of the kernel in performing the convolution to generate a corner element of the first tensor. In some implementations, innovative aspects include rescaling edge-adjacent elements of the first tensor by a third scaling factor and rescaling corner-adjacent elements of the first tensor by a fourth scaling factor to generate the output tensor.

Implementations can further include one or more of the following features. Performing the convolution of the input tensor and the kernel to generate the first tensor comprises, zero-padding the input tensor to generate a zero-padded input tensor, and performing a convolution of the zero-padded input tensor and the kernel to generate the first tensor. Performing the operations to cause each element of the first tensor to be divided by a number of elements in the window of the average pooling neural network layer to generate the initial output tensor comprises performing a first multiplication of each element of the first tensor by a first factor, the first factor being a least common denominator of (i) a number of elements of an input tensor that are multiplied with elements of a kernel with a size equal to the window of the average pooling neural network layer in performing a convolution to generate a corner element of an output tensor, (ii) a number of elements of an input tensor that are multiplied with elements of a kernel with a size equal to the window of the average pooling neural network layer in performing a convolution to generate an edge element of an output tensor, and (iii) the number of elements in the window of the average pooling neural network layer, and performing a second multiplication of each element of the first tensor by one or more second factors, each second factor being based on a number of elements of the input tensor that are multiplied with elements of the kernel in performing the convolution to generate the respective element of the first tensor. Elements of a result of performing the first multiplication have a higher bit resolution than a bit resolution of the elements of the first tensor.

Implementations can further include one or more of the following features. Performing the operations to cause each element of the first tensor to be divided by a number of elements in the window of the average pooling neural network layer to generate the initial output tensor comprises generating a masking tensor, wherein a size of the masking tensor is determined by a size of the input tensor and wherein elements of the masking tensor are determined by a size of the window of the average pooling neural network layer, and performing element-wise multiplication of each element of the first tensor and each corresponding element of the masking tensor. Generating the masking tensor comprises tiling one or more masking tensor fragments stored in memory. The input tensor is stored at a unified buffer of the hardware circuit and the masking tensor is stored at a dynamic memory of the hardware circuit, and wherein performing the operations to cause each element of the first tensor to be divided by a number of elements in the window of the average pooling neural network layer to generate the initial output tensor comprises sending the input tensor from the unified buffer to a matrix computation unit of the hardware circuit that is implemented in hardware, sending the masking tensor from the dynamic memory to the matrix computation unit of the hardware circuit, and performing, by the matrix computation unit of the hardware circuit, element-wise multiplication of the input tensor and the masking tensor to generate the first tensor.

Implementations can further include one or more of the following features. The input tensor is stored at a unified buffer of the hardware circuit and the kernel is stored at a dynamic memory of the hardware circuit, and wherein performing the convolution of the input tensor and the kernel to generate the first tensor comprises sending the input tensor from the unified buffer to a matrix computation unit of the hardware circuit that is implemented in hardware, sending the kernel from the dynamic memory to the matrix computation unit of the hardware circuit, and performing, by the matrix computation unit of the hardware circuit, the convolution of the input tensor and the kernel to generate the first tensor. Performing the convolution and performing the operations to cause each element of the first tensor to be divided are performed as fixed point operations on values stored in integer registers.

Particular embodiments of the subject matter described in this specification can be implemented so as to realize one or more of the following advantages. An output tensor corresponding to an average pooling neural network layer can be generated in hardware by a special-purpose hardware circuit, even where the hardware circuit cannot directly process an input tensor to perform average pooling. By generating the appropriate output using the special-purpose hardware circuit, the processing of an average pooling neural network layer can be performed without passing data back to a host computer, i.e., without performing at least a part of the computation off-chip, even though the special-purpose hardware circuit does not directly support average pooling. This allows for an inference of a neural network that includes an average pooling layer to be determined efficiently without modifying the hardware architecture of the special-purpose hardware circuit. That is, processing delays resulting from performing part of the processing off-chip, in software, or both, are avoided.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 is an example of a computation for rescaling edge elements in an average pooling layer of a neural network.

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. Each layer receives an input and processes the input in accordance with the set of weights for the layer to generate an output.

Therefore, in order to compute an inference from a received input, the neural network receives the input and processes it through each of the neural network layers to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a sequence. In some other implementations, the layer are arranged as directed graph. That is, any particular layer can receive multiple inputs, multiple outputs, or both. The layers of the neural network can also be arranged such that an output of a layer can be sent back as an input to a previous layer.

Some neural networks pool outputs from one or more neural network layers to generate pooled values that are used as inputs to subsequent neural network layers. In some implementations, the neural network pools a group of outputs by determining a maximum, minimum, or average of the group of outputs and using the maximum, minimum, or average as the pooled output for the group. Pooling the outputs can maintain some spatial invariance so the outputs arranged in various configurations can be processed to have the same inference. In some implementations, pooling the outputs can also reduce dimensionality of inputs received at the subsequent neural network layers while maintaining desired characteristics of the outputs before pooling, which can improve efficiency without significantly compromising the quality of inferences generated by the neural networks.

This specification describes special-purpose hardware circuitry that processes neural network layers, and optionally performs pooling on outputs of one or more neural network layers.

Figure 1:
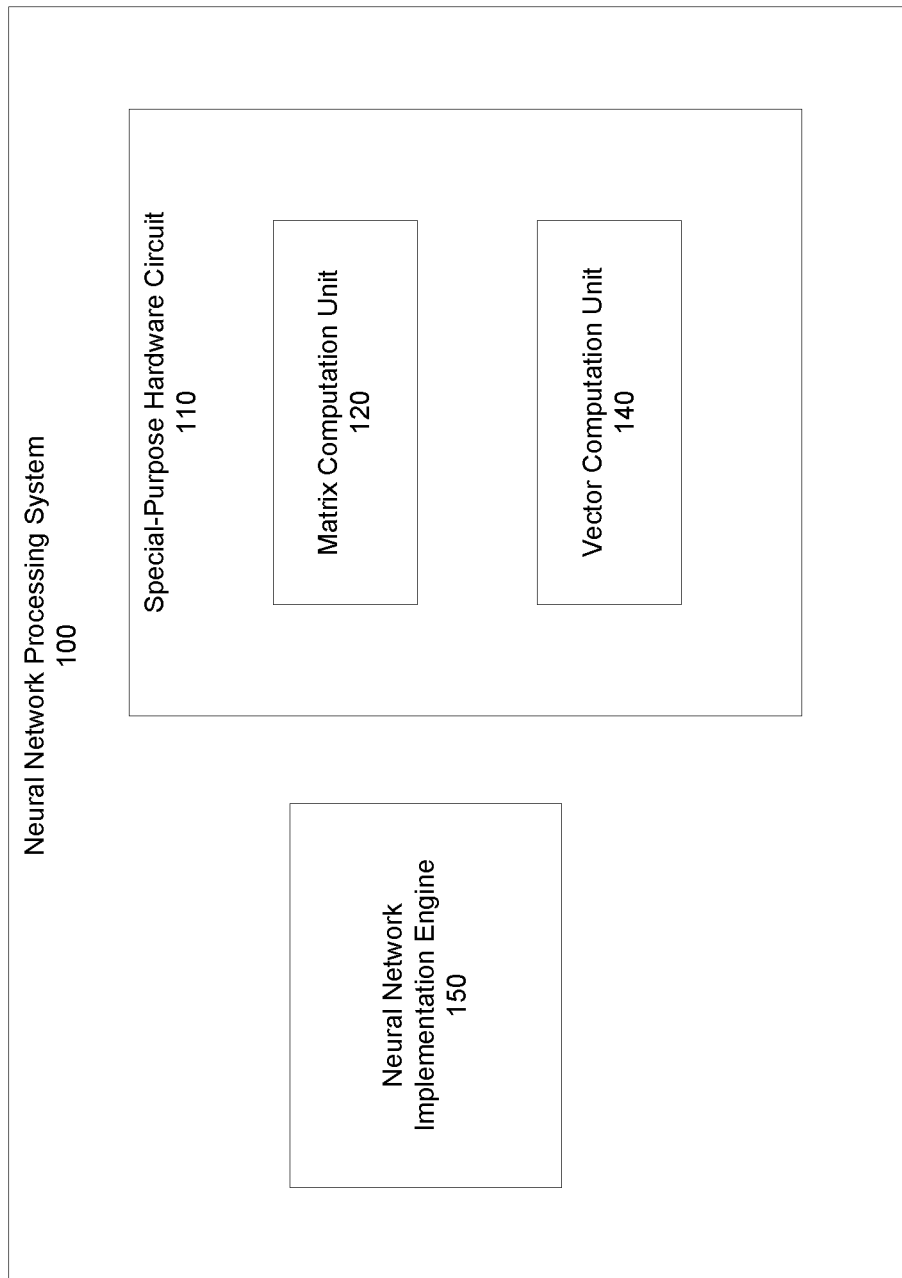
FIG. 1 shows an example neural network processing system.

FIG. 1 shows an example neural network processing system 100. The neural network processing system 100 is an example of a system implemented as one or more computers in one or more locations in which the systems, components, and techniques described below can be implemented.

The neural network processing system 100 is a system that performs neural network computations using a special-purpose hardware circuit 110. The hardware circuit 110 is an integrated circuit for performing neural network computations and includes a matrix computation unit 120 that performs vector-matrix multiplications in hardware. The hardware circuit 110 also includes a vector computation unit 140. An example special-purpose hardware circuit 120 is described in more detail below with reference to FIG. 3.

In particular, the neural network processing system 100 receives requests to implement neural networks on the special-purpose hardware circuit 110, implements the neural networks on the special-purpose hardware circuit 110, and, once a given neural network is implemented, processes inputs to the neural network using the special-purpose integrated circuit 110 to generate neural network inferences.

That is, the neural network processing system 100 can receive a request that specifies a neural network architecture for a neural network that is to be used to process inputs. The neural network architecture defines the number and configuration of layers in the neural network and values of the parameters for each of the layers that has parameters.

To implement a neural network on the special-purpose integrated circuit 110, the neural network processing system 100 includes a neural network implementation engine 150 that is implemented as one or more computer programs on one or more computers in one or more physical locations.

The neural network implementation engine 150 generates instructions that, when executed by the special-purpose hardware circuit 110, cause the hardware circuit 110 to perform the operations specified by the neural network to generate a neural network output from a received neural network input.

Once the instructions have been generated by the neural network implementation engine 150 and provided to the hardware circuit 110, the neural network processing system 100 can receive neural network inputs and can process the neural network inputs using the neural network by causing the hardware circuit 110 to execute the generated instructions.

Some neural networks, however, include one or more incompatible neural network layers. The term incompatible neural network layer as used in this specification refers to a neural network layer that specifies an operation that cannot be directly performed in hardware by the special-purpose hardware circuit 110. To implement these neural networks on the hardware circuit 110, the neural network implementation engine 150 generates instructions that, when executed by the hardware circuit 110, cause the hardware circuit 110 to generate an output for the incompatible neural network layer by performing operations in hardware that are different from those specified by the neural network layer but that result in a layer output being generated that satisfies the specification of the incompatible neural network layer, i.e., a layer output that is the same as an output that would have been generated by directly performing the operations specified by the layer.

In particular, some neural networks include an average pooling layer. Such a neural network layer defines a window for performing the average pooling. Conceptually, to generate an element of an output tensor of the average pooling layer, a region of an input tensor is identified that has the dimensions of the window, and an average of the elements within the region is determined. The window is shifted through the input tensor, i.e., with a stride of one, to generate the output tensor. In such a scenario, the output tensor will have dimensions matching those of the input tensor. The output tensor can then be provided as an inference of the neural network, or as an input tensor to a subsequent layer of the neural network.

Some neural networks may include other types of pooling layers, which generally produce a tensor in which each element is the result of an operation, e.g., an algebraic operation, being applied to subsets of elements of an input tensor. For example, a maximum pooling layer or minimum pooling layer may specify a window for the maximum or minimum pooling, where each element in an output tensor generated by the pooling layer is a respective maximum or minimum of a corresponding region of elements of the input tensor.

Because the main hardware unit that performs matrix operations on the special-purpose hardware circuit 110 is the matrix computation unit 120 and although the special-purpose hardware circuit 110 may include other circuitry that performs other neural network operations in hardware, the special-purpose hardware circuit 110 cannot directly compute an output of an average pooling layer. To implement a neural network that includes an average pooling layer, the neural network implementation engine 150 generates instructions that, when executed by the special-purpose hardware circuit 110 during processing of a neural network input by the neural network, cause the special-purpose hardware circuit 110 to perform other operations in hardware to generate an output tensor that satisfies the specification of the average pooling layer of the neural network. Specifically, the instructions can be used to generate control signals for controlling the matrix multiplication unit 120 and the vector computation unit 140 to perform operations that result in the output of a tensor that satisfies the specification of the average pooling layer. These instructions and other operations are described in more detail below with reference to FIGS. 6-10.

Figure 2:
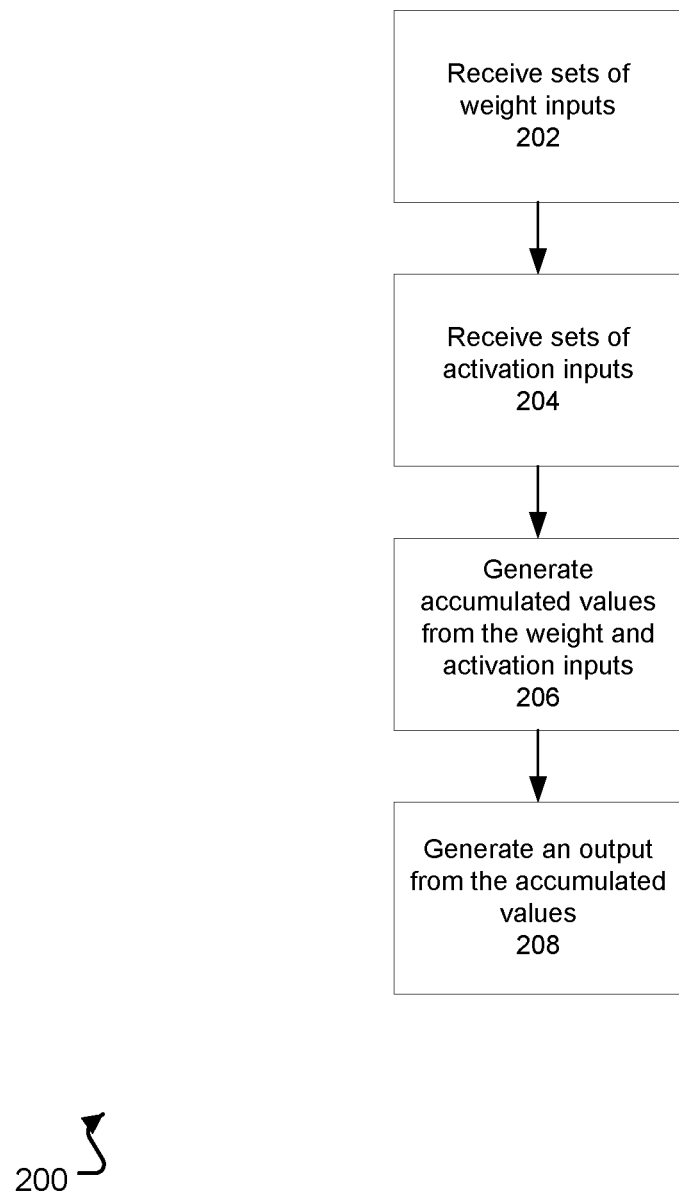
FIG. 2 is a flow diagram of an example method for performing a computation for a given layer of a neural network.

FIG. 2 is a flow diagram of an example process 200 for performing a computation for a given layer of a neural network using a special-purpose hardware circuit. For convenience, the method 200 will be described with respect to a system having one or more circuits that performs the method 200. The method 200 can be performed for each layer of the neural network in order to compute an inference from a received input.

The system receives sets of weight inputs (step 202) and sets of activation inputs (step 204) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 206). In some implementations, the accumulated values are dot products of the sets of weight inputs and the sets of activation inputs. That is, for one set of weights, which is a subset of all weights in the layer, the system can multiply each weight input with each activation input and sum the products together to form an accumulated value. The system can then compute dot products of other set of weights with other sets of activation inputs.

The system can generate a layer output from the accumulation values (step 208) using a vector computation unit of the special-purpose hardware circuit. In some implementations, the vector computation unit applies an activation function to the accumulated values, which will be described further below in reference to FIG. 5. The output of the layer can be stored in the unified buffer for use as an input to a subsequent layer in the neural network or can be used to determine the inference of the neural network. In some implementations, the neural network layer may be an average pooling layer, and the system may perform additional processing on the accumulation values to obtain an output tensor for the layer that is equivalent to an output of the average pooling layer. The system finishes processing the neural network when a received input has been processed through each layer of the neural network to generate the inference for the received input.

Figure 3:
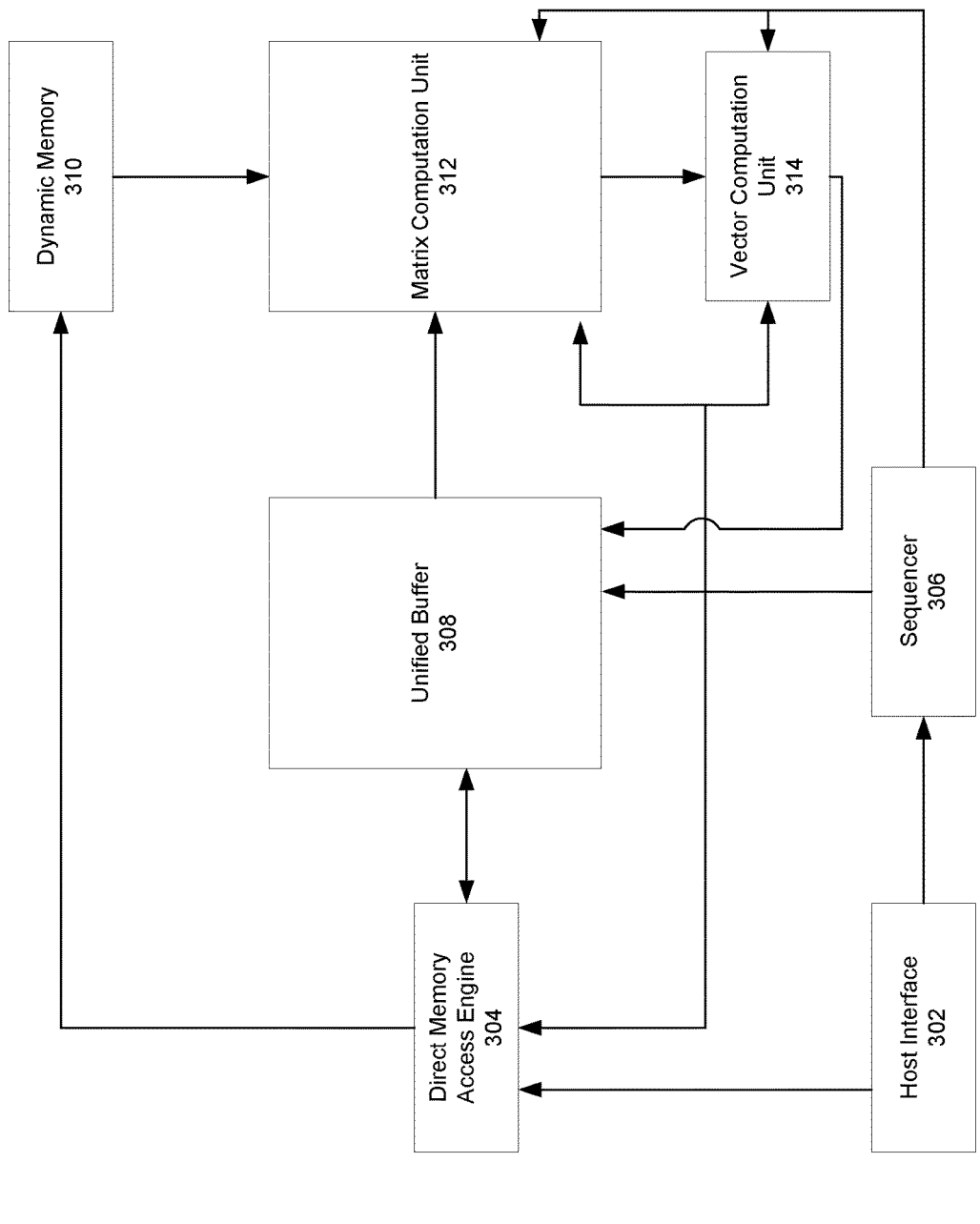
FIG. 3 shows an example neural network processing system.

FIG. 3 shows an example special-purpose hardware circuit 300 for performing neural network computations. The system 300 includes a host interface 302. The host interface 302 can receive instructions that include parameters for a neural network computation. The parameters can include one or more of the following: how many layers should be processed, corresponding sets of weight inputs for each layer of the model, an initial set of activation inputs, i.e., the input to the neural network from which the inference is to be computed, corresponding input and output sizes of each layer, a stride value for the neural network computation, and a type of layer to be processed, e.g., a convolutional layer, a pooling layer, or a fully connected layer.

The host interface 302 can send the instructions to a sequencer 306, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 306 can send the control signals to a unified buffer 308, a matrix computation unit 312, and a vector computation unit 314. In some implementations, the sequencer 306 also sends control signals to a direct memory access engine 304 and dynamic memory 310. In some implementations, the sequencer 306 is a processor that generates control signals. The sequencer 306 can use timing of the control signals to, at appropriate times, send the control signals to each component of the circuit 300. In some other implementations, the host interface 302 passes in a control signal from an external processor.

The host interface 302 can send the sets of weight inputs and the initial set of activation inputs to the direct memory access engine 304. The direct memory access engine 304 can store the sets of activation inputs at the unified buffer 308. In some implementations, the direct memory access stores the sets of weights to dynamic memory 310, which can be a memory unit. In some implementations, the dynamic memory is located off of the circuit.

The unified buffer 308 is a memory buffer. It can be used to store the set of activation inputs from the direct memory access engine 304 and outputs of the vector computation unit 314. The direct memory access engine 304 can also read the outputs of the vector computation unit 314 from the unified buffer 308.

The dynamic memory 310 and the unified buffer 308 can send the sets of weight inputs and the sets of activation inputs, respectively, to the matrix computation unit 312. In some implementations, the matrix computation unit 312 is a two-dimensional systolic array. The matrix computation unit 312 can also be a one-dimensional systolic array or other circuitry that can perform mathematical operations, e.g., multiplication and addition. In some implementations, the matrix computation unit 312 is a general purpose matrix processor.

The matrix computation unit 312 can process the weight inputs and the activation inputs and provide a vector of outputs to the vector computation unit 314. In some implementations, the matrix computation unit 312 sends the vector of outputs to the vector computation unit 314, which sends the vector of outputs to the unified buffer 308. The vector computation unit 314 can process the vector of outputs and store a vector of processed outputs to the unified buffer 308. The vector of processed outputs can be used as activation inputs to the matrix computation unit 312, e.g., for use in a subsequent layer in the neural network. The matrix computation unit 312 will be described in more detail below with reference to FIG. 4.

To process a vector, e.g., a vector of outputs received from the matrix computation unit 312, the vector computation unit 314 may include one or more of an activation unit, a normalization unit, or other units. An activation unit of the vector computation unit 314 may include circuitry that applies a non-linear function to accumulated values received from the matrix computation unit 312, e.g., tanh (x), where x is an accumulated value. The activation unit may include integer registers or buffers having widths of 8 or 16 bits. A normalization unit of the vector computation unit 314 may include circuitry for bounding accumulated values received from the matrix computation unit 312, to avoid computation errors that may be introduced by passing non-normalized accumulated values through subsequent neural network layers. Circuitry for performing other operations on accumulated values may also be included in the vector computation unit 314.

Figure 4:
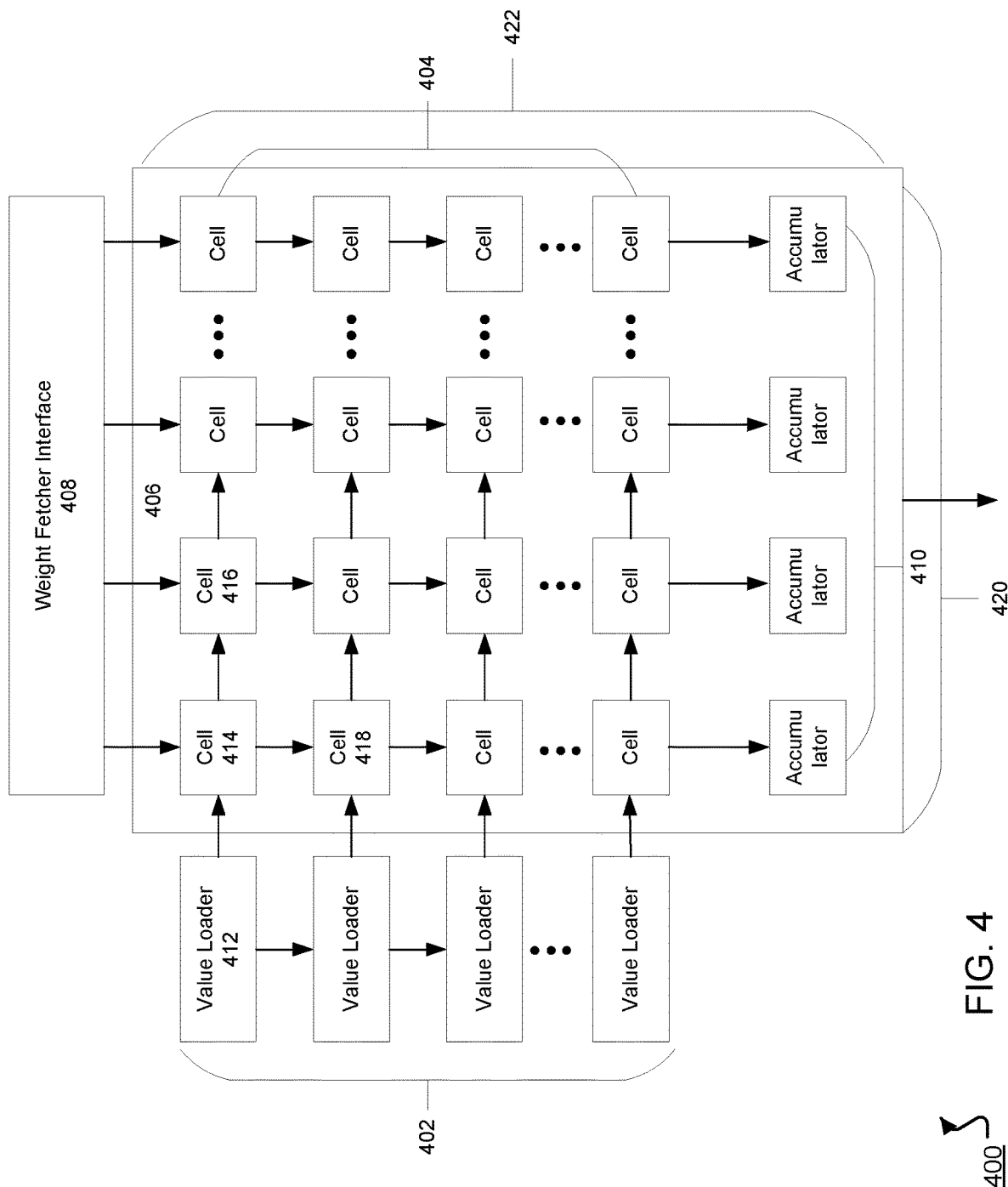
FIG. 4 shows an example architecture including a matrix computation unit.

FIG. 4 shows an example architecture 400 including a matrix computation unit. The matrix computation unit is a two-dimensional systolic array 406. The array 406 includes multiple cells 404. In some implementations, a first dimension 420 of the systolic array 406 corresponds to columns of cells and a second dimension 422 of the systolic array 406 corresponds to rows of cells. The systolic array can have more rows than columns, more columns than rows, or an equal number of columns and rows.

In the illustrated example, value loaders 402 send activation inputs to rows of the array 406 and a weight fetcher interface 408 sends weight inputs to columns of the array 406. In some other implementations, however, activation inputs are transferred to the columns and weight inputs are transferred to the rows of the array 406.

The value loaders 402 can receive the activation inputs from a unified buffer, e.g., the unified buffer 308 of FIG. 3. Each value loader can send a corresponding activation input to a distinct left-most cell of the array 406. For example, value loader 412 can send an activation input to cell 414. The value loader can also send the activation input to an adjacent value loader, and the activation input can be used at another left-most cell of the array 406. This allows activation inputs to be shifted for use in another particular cell of the array 406.

The weight fetcher interface 408 can receive the weight input from a memory unit, e.g., the dynamic memory 310 of FIG. 2. The weight fetcher interface 408 can send a corresponding weight input to a distinct top-most cell of the array 406. For example, the weight fetcher interface 408 can send weight inputs to cells 414 and 416.

In some implementations, a host interface, e.g., the host interface 302 of FIG. 3, shifts activation inputs throughout the array 406 along one dimension, e.g., to the right, while shifting weight inputs throughout the array 406 along another dimension, e.g., to the bottom. For example, over one clock cycle, the activation input at cell 414 can shift to an activation register in cell 416, which is to the right of cell 414. Similarly, the weight input at cell 416 can shift to a weight register at cell 418, which is below cell 414.

On each clock cycle, each cell can process a given weight input, a given activation input, and an accumulated output from an adjacent cell to generate an accumulated output. The accumulated output can also be passed to the adjacent cell along the same dimension as the given weight input. Each cell may also process a given weight input and a given activation input to generate an output, without processing an accumulated output from an adjacent cell. The output can be passed to adjacent cells along the same dimensions as the given weight input and output without being accumulated, e.g., to perform element-wise multiplication of a set of weights and activation inputs. An individual cell is described further below with reference FIG. 5.

In some implementations, an identity matrix, i.e., a matrix having ones on the principal diagonal and zeros elsewhere, can be passed to the array 406, thereby passing the inputs provided at the value loaders 402 to the accumulators 410 without modification. This may be used to perform element-wise multiplication of two inputs, where a first output at the accumulators can be represented as output=MatMul(input1, identity), where MatMul is an instruction for the matrix computation unit to perform matrix multiplication, and a second output corresponding to the element-wise multiplication result is represented as output*=MatMul(input2, identity).

In some implementations, matrix multiplication between an input and an identity matrix does not require multiplication with the entire identity matrix, since many of the values in the identity matrix are zeros. For example, to perform matrix multiplication of a 768×768 matrix with a corresponding 768×768 identity matrix, the 768×768 identity matrix may be processed by the matrix computation unit as 9 tiles of 256×256 matrices. In such an instance, only 3 of the 256×256 matrices would contain values other than zero, i.e., those tiles that include the principal diagonal of the 768×768 identity matrix, and the other 6 tiles are matrices that include only zeros. To reduce processing requirements, the matrix multiplication unit may perform matrix multiplication using only the 3 tiles that include non-zero valued matrices to obtain the correct multiplication result.

The accumulated output can be passed along the same column as the weight input, e.g., towards the bottom of the column in the array 406. In some implementations, at the bottom of each column, the array 406 can include accumulator units 410 that store and accumulate each accumulated output from each column when performing calculations with layers having more activation inputs than rows. The accumulator units may have 32-bit integer registers or buffers that store outputs of the cells 404. In some implementations, each accumulator unit stores multiple parallel accumulations. The accumulator units 410 can accumulate each accumulated output to generate a final accumulated value. The final accumulated value can be transferred to a vector computation unit, e.g., the vector computation unit of FIG. 3. In some other implementations, the accumulator units 410 passes the accumulated values to the vector computation unit without performing any accumulations when processing layers with layers having fewer activating inputs than rows.

Figure 5:
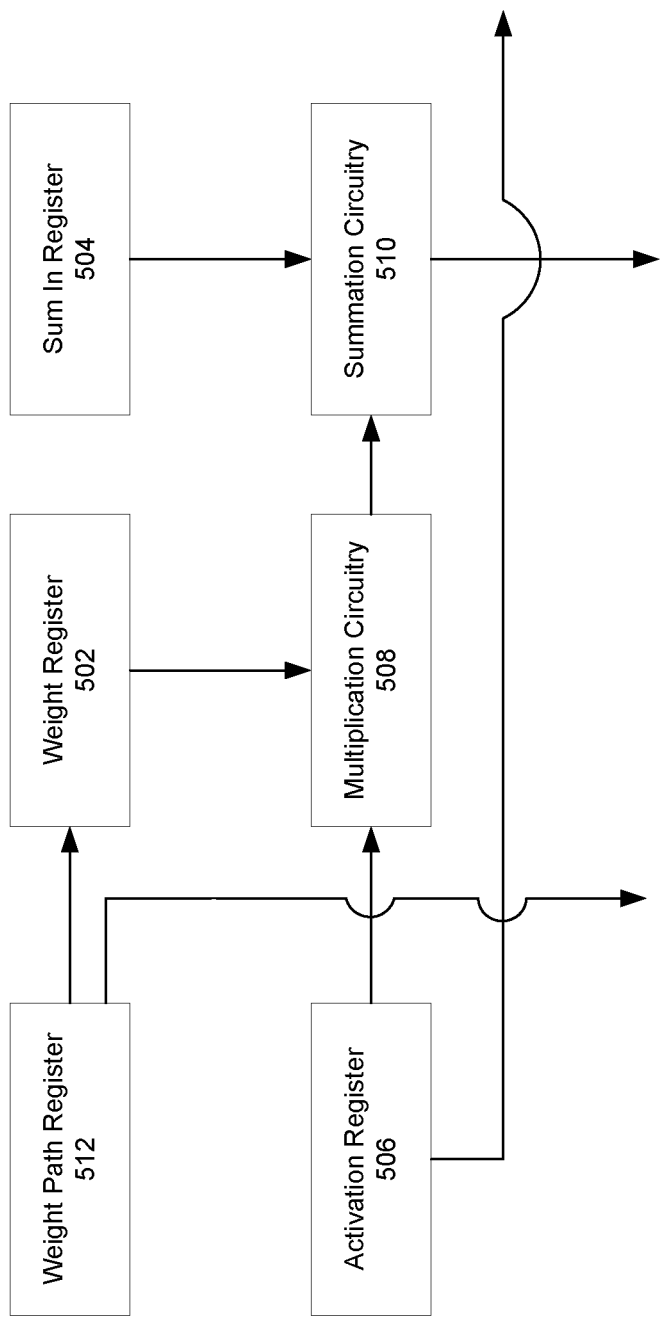
FIG. 5 shows an example architecture of a cell inside a systolic array.

FIG. 5 shows an example architecture 500 of a cell inside a systolic array, e.g., the systolic array 406 of FIG. 4.

The cell can include an activation register 506 that stores an activation input. The activation register can receive the activation input from a left adjacent cell, i.e., an adjacent cell located to the left of the given cell, or from a unified buffer, depending on the position of the cell within the systolic array. The cell can include a weight register 502 that stores a weight input. The weight input can be transferred from a top adjacent cell or from a weight fetcher interface, depending on the position of the cell within the systolic array. The cell can also include a sum in register 504. The sum in register 504 can store an accumulated value from the top adjacent cell. Multiplication circuitry 508 can be used to multiply the weight input from the weight register 502 with the activation input from the activation register 506. The multiplication circuitry 508 can output the product to summation circuitry 510.

The summation circuitry 510 can sum the product and the accumulated value from the sum in register 504 to generate a new accumulated value. The summation circuitry 510 can then send the new accumulated value to another sum in register located in a bottom adjacent cell. The new accumulated value can be used as an operand for a summation in the bottom adjacent cell.

The summation circuitry 510 can also accept a value from the sum in register 504 and send the value from the sum in register 504 to a bottom adjacent cell without summing the value from the sum in register 504 with the product from the multiplication circuitry 508. For example, to perform element-wise multiplication, a cell may receive a value at the sum in register 504 and the received value may be output to an adjacent cell, i.e., without the summation circuitry 510 adding the product to the received value. The cell may also provide the product produced by the multiplication circuitry 508, corresponding to an element-wise multiplication by the cell, to an adjacent cell without summing the product and a value received at the sum in register 504. The result is that the systolic array 406 can provide output vectors corresponding to element-wise multiplication of activation inputs and weights.

The cell can also shift the weight input and the activation input to adjacent cells for processing. For example, the weight register 502 can send the weight input to another weight register in the bottom adjacent cell. The activation register 506 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 508, or can determine whether the multiplication circuitry 508 operates on the activation and weight inputs. The control signal can also be passed to one or more adjacent cells, e.g., using a wire.

In some implementations, weights are pre-shifted into a weight path register 512. The weight path register 512 can receive the weight input, e.g., from a top adjacent cell, and transfer the weight input to the weight register 502 based on the control signal. The weight register 502 can statically store the weight input such that as activation inputs are transferred to the cell, e.g., through the activation register 506, over multiple clock cycles, the weight input remains within the cell and is not transferred to an adjacent cell. Therefore, the weight input can be applied to multiple activation inputs, e.g., using the multiplication circuitry 508, and respective accumulated values can be transferred to an adjacent cell.

Figure 6:
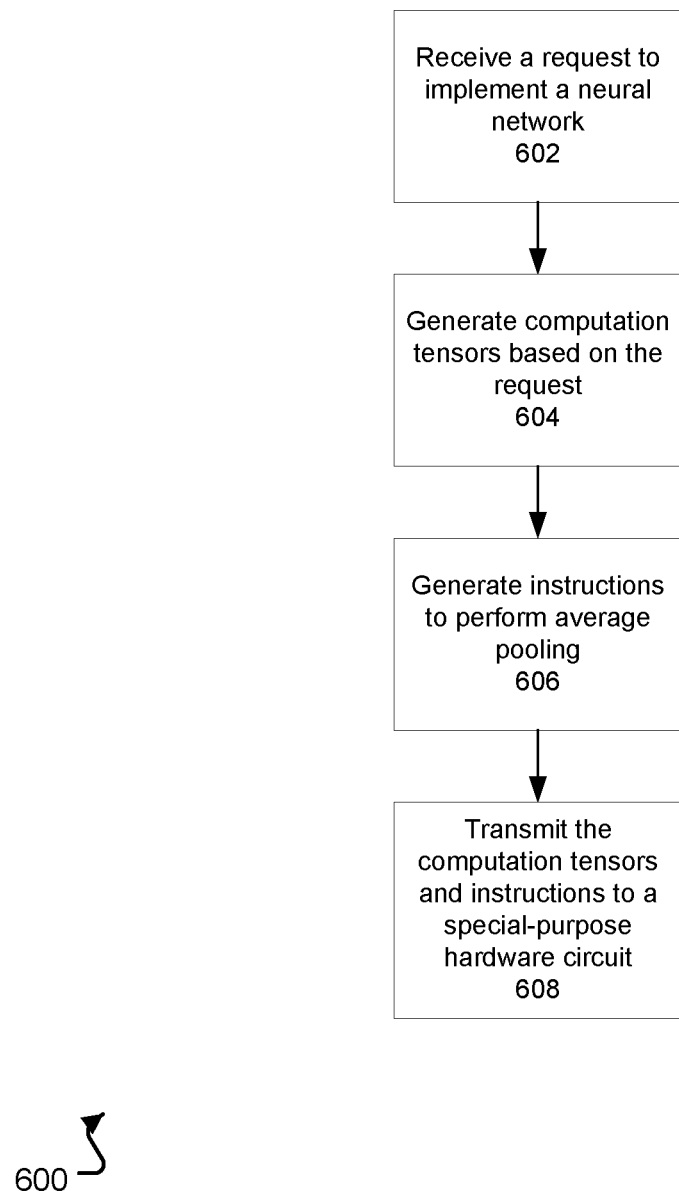
FIG. 6 is a flow diagram of an example method for instructing a neural network processing system to perform a computation for an average pooling layer of a neural network.

FIG. 6 is a flowchart of an example process 600 for performing a computation for an average pooling layer of a neural network. Generally, the process 600 is performed by a system of one or more computers that includes a special-purpose hardware circuit, for example, the system of FIG. 1.

The system receives a request to implement a neural network on the special-purpose hardware circuit (602). In particular, the neural network includes an average pooling layer. The request may specify parameters for implementing the neural network, such as a network input to process using the neural network, a location for storing an inference generated by processing the network input using the neural network, or other parameters. Some of the parameters may be specific to the average pooling layer of the neural network, such as a parameter defining window dimensions over which average pooling should be applied.

The system generates computation tensors based on the request that are used in processing the average pooling layer of the neural network (604). For example, based on receiving the request to implement the neural network specifying a network input to the neural network and a window of the average pooling layer of the neural network, the system generates a pooling kernel, a zero-padded input tensor for processing the average pooling layer, a masking tensor for processing the average pooling layer, and an optional third tensor for processing the average pooling layer.

A first computation tensor used in computing the average pooling layer is a pooling kernel. Generally, a kernel is a matrix used in computations with an input matrix that typically has smaller dimensions than the input matrix. The pooling kernel is composed of identity matrices and has dimensions matching the average pooling window specified for the average pooling layer. For a 3×3 window, for example, the pooling kernel will be a 3×3 kernel, where each element of the kernel is an identity matrix having dimensions of D×D, where D is the depth of the input tensor being processed by the average pooling layer of the neural network. Each identity matrix is composed of values, e.g., ones and zeros, such that a convolution of the pooling kernel and a region of an input tensor will result in an element having a value equal to a sum of the elements within the region at a particular depth.

For instance, where the depth of the input tensor is one, i.e., the input tensor is a two-dimensional input tensor, the identity matrix will be a 1×1 matrix of ones, i.e., a scalar element with a value of one. Thus, the pooling kernel will be a two-dimensional matrix composed of ones, since each element of the pooling kernel is a 1×1 matrix of ones, i.e., a scalar value with a value of one. However, if the input tensor has a depth of three, the pooling kernel will be a two-dimensional tensor having the specified size of the average pooling window, where each element of the pooling kernel is a 3×3 identity matrix having ones on the principal diagonal and zeros elsewhere. Thus, multiple dimensions of the input tensor may be processed in parallel.

The neural network computation unit 150 may generate the identity matrices and the pooling kernel composed of identity matrices, and may store the identity matrices and/or pooling kernel at a location accessible by the special-purpose hardware circuit 110, e.g., at the dynamic memory 310. Alternatively, the neural network computation engine 150 may provide the identity matrices and/or pooling kernel to the special-purpose hardware circuit 110, or may provide instructions to the special-purpose hardware circuit 110 for generating the pooling kernel, e.g., where the pooling kernel or the instructions for generating the pooling kernel may be received by the host interface 302.

A second computation tensor used in computing the average pooling layer may be a zero-padded input tensor. For example, the system may receive a request to implement a neural network that includes an average pooling layer, and based on the request, the system may zero-pad a network input tensor specified by the request, or an input tensor to the average pooling layer to generate a zero-padded input tensor. The zero-padded input tensor may be generated based on a window specified for the average pooling layer of the neural network. In some implementations, the neural network implementation engine 150 of the system may zero-pad the input tensor, and may provide the zero-padded input tensor to the special-purpose hardware circuit 110. Alternatively, the neural network implementation engine 150 may generate instructions for controlling the special-purpose hardware circuit 110 to generate the zero-padded input tensor. The instructions and the input tensor may be received by the host interface 302 of the special-purpose hardware circuit, and control signals based on the received instructions may control the vector computation unit 314, the direct memory access engine 304, or another component of the special-purpose hardware circuit to store a zero-padded version of the input tensor at the unified buffer 308.

In some implementations where zero-padding is performed by the special-purpose hardware circuit 110, the zero-padding is achieved by first copying the input tensor to the appropriate parts of the output, e.g., in the unified buffer 308, and then writing zeros at the appropriate positions in the memory to obtain a zero-padded input tensor. For example, for an 8×8 input tensor and a 3×3 window for an average pooling layer, a zero-padded input tensor would be a 10×10 tensor. Assuming a raster-scan ordering of data for both inputs and outputs of the zero-padding, the zero-padded output tensor would be structured as an initial 10 zeros corresponding to a first row of zero-padding of the input matrix, followed by 8 rows that is each composed of one zero of left padding, eight values from a row of the input tensor, and another zero of right padding, followed by another 10 zeros corresponding to a last row of zero-padding.

To achieve this zero-padding, the input tensor can be loaded from the unified buffer 308 into the matrix computation unit 312, e.g., based on control signals generated from instructions from the neural network implementation engine 150. Multiplication of the input tensor and an identity matrix is performed at the matrix computation unit 312 to load the activation values of the input tensor into the accumulators, where they can then be stored in the appropriate places in the unified buffer 308 for the zero-padded input tensor. The vector computation unit 314 can then write the appropriate zeros at the unified buffer 308 to generate the zero-padded input tensor.

In some implementations, the system may also generate a third computation tensor for processing the average pooling layer of the neural network. The third tensor is composed of elements that each equals an inverse of the number of elements in the window of the average pooling neural network layer. The neural network implementation 150 may generate the third tensor based on the received request to implement the neural network. For example, the neural network implementation engine 150 may generate a third tensor that has a same size as an input tensor to the average pooling layer of the neural network, and may populate the tensor with values equal to an inverse of the number of elements in the window specified for the average pooling layer. The generated third tensor may be stored at a memory location accessible by the special-purpose hardware circuit 110, or may be provided to the special-purpose hardware circuit 110, for use in computing the average pooling layer. Alternatively, the special-purpose hardware circuit 110 may generate the third tensor based on instructions received from the neural network implementation engine 150.

In some implementations, a fourth computation tensor generated by the system is a masking tensor. Generally, the masking tensor is composed of values for performing rescaling operations in the computation of the average pooling layer of the neural network. Specifically, the values of the masking tensor may be determined based on the dimensions of the input tensor to the average pooling layer and the window specified for the average pooling layer, such that each value reflects the number of input tensor values averaged to generate the corresponding value of the output tensor.

A size of the masking tensor may be determined based on dimensions of the specified network input or an expected size of an input tensor to the average pooling layer of the neural network. The values of elements in the masking tensor may be determined based on the specified window of the average pooling layer and the dimensions of the network input or input tensor to the average pooling layer. The elements of the masking tensor are set so as to allow for rescaling of elements produced in performing average pooling computations, e.g., to rescale edge and corner elements of an initial output tensor produced during the processing of the average pooling layer. If a neural network includes more than one average pooling layer, the system may generate a masking tensor for each of the average pooling layers. In some implementations, the system generates the masking tensor by tiling one or more masking tensor fragments that are stored in memory. For example, rows of elements or segments of rows of elements may be tiled to generate the masking tensor. In some implementations, the system may store, e.g., in memory, a library of masking matrices, and may select a masking matrix from the library.

The masking tensor may be generated by the neural network implementation engine 150, or instructions may be generated for controlling the special-purpose hardware circuit 110 to generate the masking tensor. For example, the neural network implementation engine 150 may generate the masking tensor based on the request to implement the neural network and store the masking tensor in a memory location accessible by the special-purpose hardware circuit 110, e.g., at the dynamic memory 310. To generate the masking tensor, the neural network implementation engine 150 may access tensor fragments and may compile the tensor fragments to generate the masking tensor in the memory. Alternatively, the neural network implementation engine 150 may generate the masking tensor and provide the masking tensor to the special-purpose hardware circuit 110 where it may be received by the host interface 302. In other implementations, the neural network implementation engine 150 can provide instructions to the special-purpose hardware circuit 110 for controlling the special-purpose hardware circuit 110 to generate the masking tensor. For example, the instructions can control the special-purpose hardware circuit 110 to generate the masking tensor, e.g., from tensor fragments accessible at the dynamic memory 110, and to store the masking tensor, e.g., at the dynamic memory 110.

The system generates instructions that, when executed by the special-purpose hardware circuit of the system, cause the special-purpose hardware circuit to, during processing of a network input by the neural network, generate a layer output tensor that is equivalent to an output of the average pooling neural network layer (606). For example, in response to the request, the neural network implementation engine 150 of the system of FIG. 1 generates instructions that direct or control the special-purpose hardware circuit 110 to generate an output tensor, i.e., an output vector, that is equivalent to an output that the special-purpose hardware circuit 110 would generate if it processed an input tensor by performing average pooling on the input tensor.

The system transmits the instructions and the computation tensors to the special-purpose hardware circuit (608). For example, the neural network implementation engine 150 can provide the instructions to the special-purpose hardware circuit 110 of the system of FIG. 1, and the special-purpose hardware circuit 110 can receive the instructions, e.g., at the host interface 302 of the special-purpose hardware circuit. The neural network implementation engine 150 may also provide the computation tensors to the special-purpose hardware circuit 110, e.g., where they can be received by the host interface 302. Alternatively, the instructions provided to the special-purpose hardware circuit 110 may enable the special-purpose hardware circuit 110 to generate or access, e.g., in memory, the computation tensors for computing the average pooling layer. The neural network implementation engine 150 may also provide other instructions and/or parameters for the computation of the neural network that can be received by special-purpose hardware circuit 110.

Figure 7:
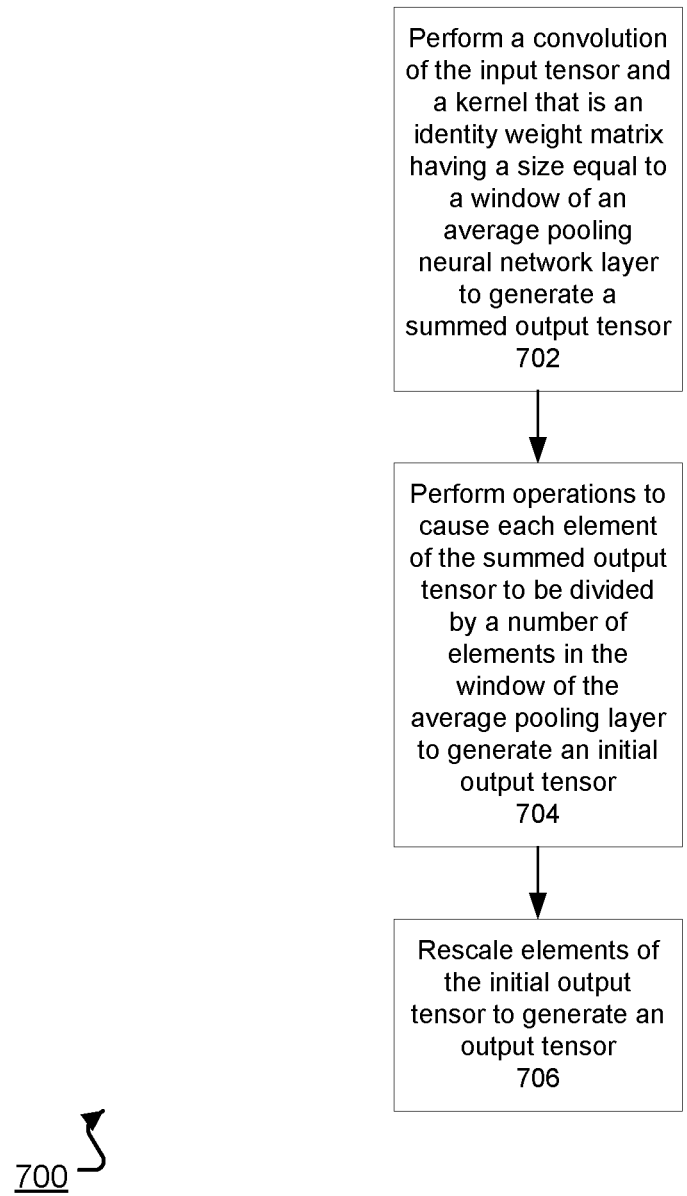
FIG. 7 is a flow diagram of an example method for performing a computation for an average pooling layer of a neural network.

FIG. 7 is a flowchart of an example process 700 for computing an average pooling layer of a neural network. In some implementations, the process 700 can be performed by the special-purpose hardware circuit 110 of the system of FIG. 1, based on instructions received from the neural network implementation engine 150.

For example, the special-purpose hardware circuit 110 can be provided with the instructions generated by the neural network implementation engine 150 as described at FIG. 6, and can perform the process 700 based on the instructions. The instructions may be received by the host interface 302 of the special-purpose hardware circuit and sent to the sequencer 306 of the special-purpose hardware circuit, where the sequencer 306 may convert the instructions into low-level control signals that control components of the special-purpose hardware circuit to perform the average pooling layer computation.

Based on the received instructions, the special-purpose hardware circuit performs a convolution of an input tensor to the average pooling neural network layer and a kernel that is pooling kernel with a size equal to a window of the average pooling neural network layer to generate a summed output tensor (702). For example, control signals generated based on the received instructions control the special-purpose hardware circuit to perform a convolution of an input tensor to the average pooling layer of the neural network, e.g., a network input or an output of a preceding layer of the neural network, and a pooling kernel. If the average pooling layer of the neural network is a first layer in the neural network, then the average pooling layer would process a network input to the neural network, e.g., an input representing a digital image comprising elements that correspond to pixels of the digital image. Otherwise, if the average pooling layer of the neural network is not a first layer in the neural network, then the input tensor may be an output tensor of a preceding layer of the neural network.

To perform the convolution, the input tensor may be located in the unified buffer 308, e.g., if the input tensor is an output of a preceding layer of the neural network, or can be received and stored at the unified buffer 308, e.g., if the input tensor is a network input. The input tensor can then be sent from the unified buffer 308 to the matrix computation unit 312. Additionally, a pooling kernel, i.e., a matrix of having identity matrices as its elements, may be generated or received as discussed at FIG. 6, and stored at the dynamic memory 310. The size of the pooling kernel is determined based on the window of the average pooling layer. For example, if the average pooling layer specifies a 3×3 window for average pooling, then a 3×3 pooling kernel may be received, e.g., at the host interface 302, and sent to the dynamic memory 310, or may be identified in the dynamic memory 310, e.g., where the dynamic memory 310 stores a set of pooling kernels of differing dimensions. The elements, i.e., identity matrices, of the pooling kernel are sent from the dynamic memory 310 to the matrix computation unit 312.

The matrix computation unit 312 performs a convolution of the input tensor and the pooling kernel to generate a summed output tensor. Convolving the input tensor with the pooling kernel results in a summed output tensor with a size matching that of the input tensor. In some implementations, the convolution may be performed using techniques disclosed in U.S. patent application Ser. No. 14/844,738, which is hereby incorporated by reference in its entirety. Each element of the summed output tensor is equivalent to a sum of elements of the input tensor within a region of the input tensor defined by the window when applied to a corresponding element of the input tensor. Where the input tensor has a depth D greater than 1, such that the elements of the pooling kernel are each a D×D identity matrix, convolution of the input tensor and the pooling kernel is such that different depths of the input tensor may be processed in parallel to generate the summed output tensor. The summed output tensor may be stored at the unified buffer 308. In some examples, the matrix computation unit 312 may provide the summed output tensor to the vector computation unit 314, and the vector computation unit 314 stores the summed output tensor in the unified buffer 308.

In some implementations, performing the convolution of the input tensor and the pooling kernel involves performing a convolution of a zero-padded input tensor and the pooling kernel. For example, as discussed with respect to FIG. 6, a zero-padded version of an input tensor may be generated, and the zero-padded input tensor and the pooling kernel may be convolved to generate the summed output tensor. To perform the convolution, the zero-padded input tensor may be generated and stored at the unified buffer 308. A convolution process similar to that described above may then be performed to generate a summed output tensor having the same size as the input tensor. For example, the zero-padded input tensor and the pooling kernel may be provided to the matrix computation unit 312, where the matrix computation unit 312 can perform the convolution operation and send the resulting values to the unified buffer 308 to be stored as the summed output tensor.

In some implementations, the convolution operations utilize fixed point arithmetic. To maintain resolution, the results of the convolution can be maintained at the accumulators 410 of the matrix computation unit. Because, in some implementations, the accumulators are each 32 bits wide, the results of the convolution, i.e., the sums of the elements of the input tensor that are within the pooling window, will not overflow the accumulators 410. Thus, resolution can be maintained at this step of the average pooling computation.

Based on the received instructions, the special-purpose hardware performs operations to cause each element of the summed output tensor to be divided by a number of elements in the window of the average pooling neural network layer to generate an initial output tensor (704). For example, control signals may be generated by the sequencer 306 based on instructions received at the host interface 302 from the neural network implementation engine for multiplying each element of the summed output tensor by a factor equal to an inverse of the number of elements in the window of the average pooling neural network layer.

In some implementations, the control signals cause the special-purpose hardware circuit to generate the initial output tensor by performing an element-wise multiplication of the summed output tensor and a tensor composed of elements that each equals an inverse of the number of elements in the window of the average pooling neural network layer. As discussed with respect to FIG. 6, the special-purpose hardware circuit may receive such a matrix, e.g., at the host interface 302, and may store the matrix at the dynamic memory 310. Alternatively, the special-purpose hardware circuit may perform operations to generate the matrix and to store the matrix in the dynamic memory 310. The matrix may have a size matching that of the summed output tensor, which also matches that of the input tensor. For example, if an average pooling layer is specified as having a 3×3 window, i.e., a window of 9 elements, then a matrix of elements having values of ⅑ (or approximately 0.11) and having the dimensions of the summed output tensor can be received by the host interface 302 of the special-purpose hardware circuit. The matrix can be stored at the dynamic memory 310. Alternatively, such a matrix may be already stored dynamic memory 310, and may be identified by the special-purpose hardware circuit.

To perform element-wise multiplication of the summed output vector and the matrix, the summed output vector may be provided from the unified buffer 308 to the matrix computation unit 312, and the other matrix may be provided from the dynamic memory 310 to the matrix computation unit 312. Element-wise multiplication of the matrices may be performed, and an output of the element-wise multiplication may be stored at the unified buffer 308. For instance, the matrix computation unit 312 may perform the element-wise multiplication based on received control signals and provide the resulting initial output tensor to the vector computation unit 314, which may then store the initial output tensor at the unified buffer 308.

Alternatively, multiplication of the elements of the summed output vector by the factor equal to the inverse of the number of elements in the window may be achieved by performing scalar multiplication of the summed output vector with the factor. For example, the summed output vector may be provided from the matrix computation unit 312 to the vector computation unit 314, and the vector computation unit 314 may apply a function to the summed output vector to multiply the elements of the summed output vector by the factor to generate the initial output vector. The vector computation unit 314 may then store the initial output vector at the unified buffer 308.

While discussed herein as being performed by multiplication, in some implementations other operations may be performed to obtain the initial output vector. Thus, the special-purpose hardware circuit may perform operations to divide the elements of the summed output vector by the number of elements in the specified window of the average pooling layer to obtain the initial output vector, instead of the special-purpose hardware circuit multiplying the elements of the summed output vector by an inverse of the number of elements of the specified window of the average pooling layer, i.e., where the special-purpose hardware circuit is capable of performing division.

While performing steps 702 and 704 enables the special-purpose hardware circuit to provide an output that is largely accurate for the average pooling layer, the output will have certain elements that are not proper averages. For example, when applying an average pooling layer with a 3×3 window to a corner element of an input tensor, a value of a corresponding corner element of an output tensor would be an average of only the corresponding corner element of the input tensor and the 3 adjacent elements in the input tensor, i.e., an average of only 4 elements. However, by multiplying the corner element of the summed output vector by an inverse of the number of elements of the 3×3 window, i.e., multiplying by ⅑, the computed average in the initial output tensor is likely to be incorrect for that element.

To address this issue, the system can rescale elements of the initial output tensor to generate an output tensor (706). To perform the rescaling, the special-purpose hardware circuit 110 may receive or generate a masking tensor as discussed with respect to step 604 of FIG. 6. The masking tensor may be accessible by the special-purpose hardware circuit, e.g., at the dynamic memory 310, and may be provided to the matrix computation unit 312. The initial output tensor may be provided to the matrix computation unit 312 from the unified buffer 308. Element-wise multiplication of the initial output tensor and the masking tensor may be performed to generate an output tensor corresponding to an output of the average pooling layer of the neural network. The output tensor may be stored at the unified buffer 308, e.g., by the vector computation unit 314.

As discussed with respect to step 604 of the process 600, the masking tensor may be of a size corresponding to the size of the input tensor, which also corresponds to the size of the summed output tensor and the initial output tensor. The values of the masking tensor may be determined based on the dimensions of the input tensor and the window specified for the average pooling layer of the neural network, such that each value reflects the number of input tensor values averaged to generate the corresponding value of the output tensor. For example, for a 3×3 averaging window and a two-dimensional input tensor of size 3×3 or larger, the masking tensor will include factors of 9/4 for corner elements and 9/6 for edge elements, with the remainder of the values of the masking tensor being ones. Thus, after multiplication by the factor equal to the inverse of the number of elements in the window, i.e., 1/9, rescaling corner elements by a scale of 9/4 will result in the corner value of the summer output tensor being divided by 4, which is appropriate since applying the 3×3 pooling kernel to corner elements of the input tensor results in 4 elements of the input tensor being summed to produce a corner element of the summed output tensor.

In other implementations, instead of performing operations to cause the elements of the summed output tensor by a number of elements in the window of the average pooling layer, the system may first determine a least common denominator for the number of activation values of the input tensor summed to generate each value of the summed output tensor. Thus, for the 3×3 window and a 3×3 or larger two-dimensional input tensor, 4 elements of the input tensor are summed to generate a corner element of the summed output tensor, 6 elements of the input tensor are summed to generate an edge element of the summed output tensor, and 9 elements of the input tensor are summed to generate the other elements of the input tensor. Thus, the least common denominator would be 36. To generate the proper values for the average pooling layer, a masking tensor may be determined that has nines at the corner elements, sixes at the edge elements, and fours elsewhere. Performing operations to cause each element of the summed output tensor to be divided by the least common denominator, followed by rescaling using the masking tensor, would then result in an output tensor that is an accurate output for the average pooling layer. That is, performing element-wise multiplication of the summed output tensor by a matrix composed of an inverse of the least common denominator, i.e., 1/36 or approximately 0.03, combined with element-wise multiplication with the masking tensor, would result in an output tensor that is an accurate output for the average pooling layer of the neural network.

Such a technique, in which integer multiplication is performed as opposed to fractional multiplication, is employed in certain implementations to maintain resolution of the values produced throughout the computations. As discussed, in some implementations, accumulators 410 of the matrix computation unit 312 are 32 bits wide, while activations, e.g., at the activation unit of the vector computation unit 314, are either 8 bits or 16 bits wide. The system can perform fixed point arithmetic using the 32-bit, 8-bit, or 16-bit registers to perform computations in producing an average pooling layer output. However, only the activations are capable of performing fractional operations. Because the activations have a lower resolution, i.e., 8 or 16 bits versus 32 bits, it is desirable to perform integer computations to maintain resolution where possible. Once activation operations, e.g., by the activation unit of the vector computation unit 314, are performed on values stored in the 32-bit accumulators, resolution of the resulting values will be lost.

Thus, performing element-wise multiplication using integers, the results may be maintained in the accumulators at a higher resolution than if element-wise multiplication was performed using fractions in the in the activations. Where the average pooling operations can be performed using only integer arithmetic, i.e., without using fractional multiplication, a highest resolution can be maintained. Where at least some fractional arithmetic must be performed, reducing the number of fractional arithmetic operations performed in the activations can reduce the quantization artifacts produced by using the lower-resolution activations.

Figure 8:
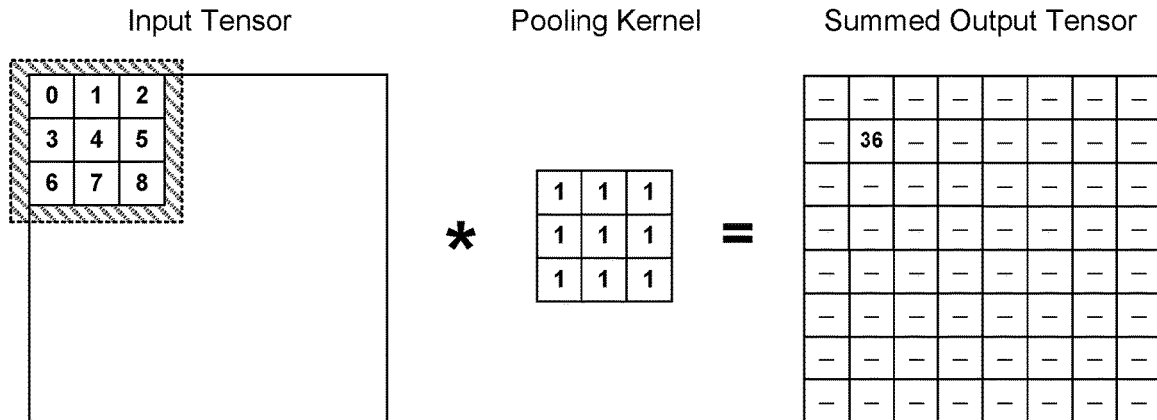
FIG. 8 is an example of a computation for an average pooling layer of a neural network.
Figure 8:
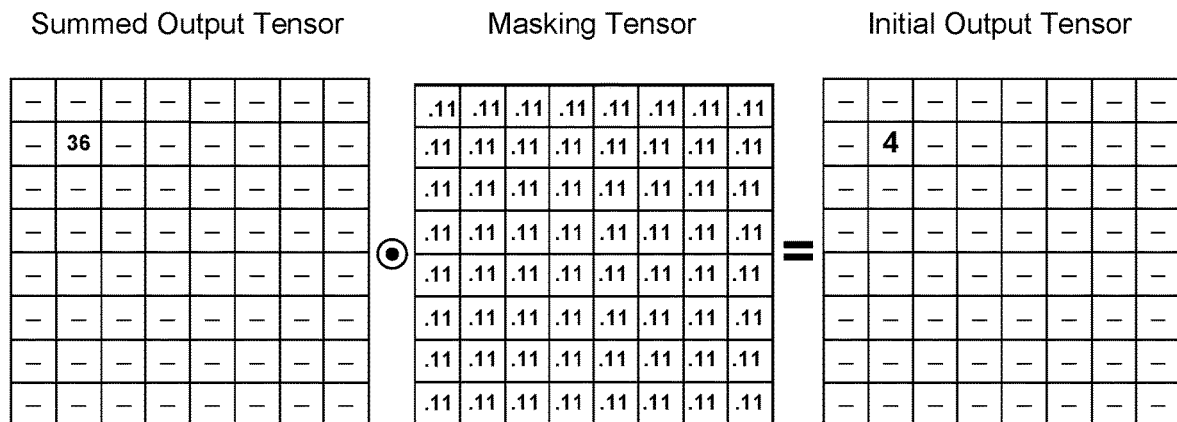
Figure 8:
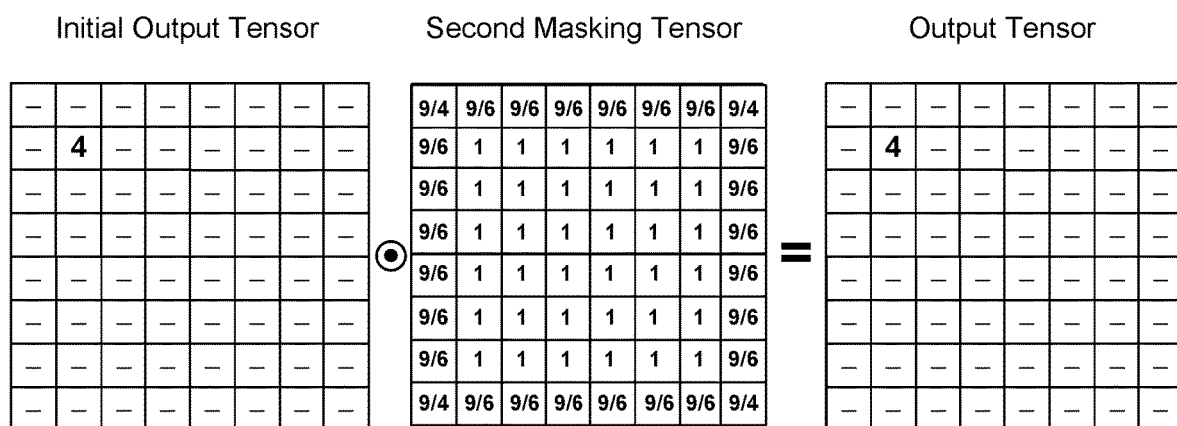

FIG. 8 depicts an example of a computation for an average pooling layer of a neural network. The example of FIG. 8 may be performed using the processes of FIG. 7 by the special-purpose hardware circuit of FIG. 3. By way of illustration, the example of FIG. 8 applies an average pooling layer to a two-dimensional 8×8 array of activation values. The average pooling layer of the neural network may have a 3×3 window, e.g., a request to implement the neural network may specify that the average pooling layer has a 3×3 window, meaning that each element of an output of the average pooling layer will be a numerical average of the corresponding element of an input tensor and the 8 elements of the input tensor that are adjacent to the corresponding element of the input tensor. The 8×8 input tensor shown in FIG. 8 may represent an 8×8 portion of an image input to the neural network as a network input, or may represent an 8×8 portion of another input tensor, e.g., an input tensor corresponding to an output of a preceding layer of the neural network.

In part (a) of FIG. 8, a convolution of the 8×8 input tensor and pooling kernel is performed to generate a summed output tensor. As shown, the pooling kernel is a 3×3 kernel of ones. This is because the input tensor is two-dimensional, i.e., has a depth of one, such that each element of the pooling kernel is 1×1 identity matrix, i.e., a scalar value of one. Convolution of the input tensor and the pooling kernel results in the summed output tensor, where each element of the summed output tensor corresponds to a sum of a corresponding element of the input tensor and the eight elements adjacent to the corresponding element of the input tensor, i.e., when written in matrix format, the 8 elements surrounding the corresponding element of the input tensor. Because the input tensor may be stored in memory, i.e., in the uniform buffer 308, in raster order, the elements of the input tensor summed to generate an element of the summed output tensor may not be adjacent in memory. While not shown in FIG. 8, the input tensor may also be a zero-padded input tensor as described with respect to the process 700 of FIG. 7.

For the specific example shown in part (a) of FIG. 8, the 3×3 pooling kernel is applied to the input tensor to generate an element of the summed output tensor corresponding to a (1,1) position of the summed output tensor. Thus, the (1,1) element of the summed output tensor is a summation of elements corresponding to the (0,0), (1,0), (2,0), (1,0), (1,1), (1,2), (2,0), (2,1), and (2,2) matrix positions of the input tensor. Thus, for the values shown in part (a), the element corresponding to the (1,1) position of the summed output tensor is 36. Other elements of the summed output tensor would be similarly computed, but are not shown in the example of FIG. 8.

In part (b) of FIG. 8, the elements of the summed output tensor are multiplied by a factor equivalent to an inverse of the number of elements in the window of the average pooling neural network layer to generate an initial output tensor. To perform the multiplication, a masking tensor is generated that has a size equivalent to the size of the summed output tensor, which is also the same as the size of the input tensor. Elements of the masking tensor are equal to an inverse of the number of elements in the window of the average pooling neural network layer. Thus, as shown in FIG. 8, the masking tensor is an 8×8 array of values each equaling 1/9, shown in FIG. 8 as an approximated 0.11.

Element-wise multiplication of the summed output tensor and the masking tensor results in an initial output tensor, where each element of the initial output tensor is equal to the product of a corresponding element of the summed output tensor and a corresponding element of the masking tensor. Thus, the element located at the (1,1) position of the initial output tensor is 4, based on 36*(1/9)=4. Other elements of the initial output tensor may be similarly computed, but are not shown in FIG. 8. Additionally, while shown in FIG. 8 as being performed by element-wise multiplication, in some implementations the initial output tensor may be achieved by performing scalar multiplication of the summed output tensor and a factor equivalent to the inverse of the number of elements in the window of the average pooling layer. Thus, for the example shown in FIG. 8, scalar multiplication of the summed output tensor and 1/9, e.g., performed by the vector computation unit 314, would result in the initial output tensor.

In part (c) of FIG. 8, elements of the initial output tensor are rescaled to generate an output tensor for the average pooling layer of the neural network. To perform the rescaling, element-wise multiplication is performed between the initial output tensor and a second masking tensor. A size of the second masking tensor matches the size of the initial output tensor, which is also the same as the size of both the summed output tensor and the input tensor. Elements of the second masking tensor are determined based on a number of elements of the input tensor that are multiplied with elements of the pooling kernel in performing the convolution at part (a) of FIG. 8. Thus, in the example of FIG. 8, applying the 3×3 weight matrix to a corner element of the input tensor results in 4 of the 9 elements of the pooling kernel being multiplied with elements of the input tensor, and applying the 3×3 pooling kernel to an edge element of the input tensor results in 6 of the 9 elements of the pooling kernel being multiplied with elements of the input tensor. For all other elements of the input tensor, applying the 3×3 pooling kernel results in all 9 of the elements of the pooling kernel being multiplied with an element of the input tensor.

The elements of the second masking tensor are therefore set such that the first multiplication by the number of elements of the window of the average pooling layer and the second multiplication by the rescaling factor will result in the proper averaging computation being applied for each element of the output tensor. Thus, for a corner element of the input tensor, where only 4 elements of the input tensor are averaged when the pooling kernel is applied to the corner element, the multiplication of the corresponding element of the summed output tensor first by 1/9, i.e., 0.11 as shown in part (b), and then by 9/4, results in an effective division of the corner element of the summed output vector by 4.

In some implementations, the masking tensor of part (b) and the second masking tensor of part (c) are generated by the neural network implementation engine 150 of FIG. 1, and provided to the special-purpose hardware circuit 110. The special-purpose hardware circuit 110 can receive the generated masking tensors, e.g., at the host interface 302, and can store the masking tensors for use in the computations of the average pooling layer, e.g., by storing the masking tensors at the dynamic memory 310. Alternatively, the neural network implementation engine 150 may provide instructions to the special-purpose hardware circuit 110 that cause the special-purpose hardware circuit to generate and/or store the masking tensors at the dynamic memory 310, e.g., by causing the special-purpose hardware circuit 110 to tile tensor fragments to generate the masking tensors, and to store the generated masking tensors at the dynamic memory 310.

Element-wise multiplication of the initial output tensor and the second masking tensor results in the output tensor that can then be stored at the unified buffer 308 as the output of the average pooling layer of the neural network. For the example shown in FIG. 8, all 9 elements of the pooling kernel are applied to the element of the input tensor having the position (1,1), and so the corresponding factor of the second masking tensor is 1. Thus, the (1,1) position element of the output tensor is the same as the corresponding element of the initial output tensor, having a value of 4. The same element-wise multiplication may be performed for all other elements of the initial output tensor to generate the output tensor.

In some instances, the element-wise multiplications shown at FIG. 8 of the summed output tensor and the masking tensor, and of the initial output tensor and the second masking tensor, are performed in the activations, e.g., at the activation unit of the vector computation unit 314. This may occur where the operations are both fractional fixed point arithmetic operations that, in some implementations, can be handled by the activations but not by the accumulators.

FIG. 9 depicts another example of a computation of an average pooling layer of a neural network. The example of FIG. 9 may be performed using the process of FIG. 7. By way of illustration, the example of FIG. 9 applies an average pooling layer to an 8×8 array of activation values. The average pooling layer of the neural network may have a 3×3 window, e.g., a request to implement the neural network may specify that the average pooling layer has a 3×3 window, meaning that each element of an output of the average pooling layer will be a numerical average of the corresponding element of an input tensor and the 8 adjacent elements of the corresponding element of the input tensor. The 8×8 input tensor shown in FIG. 9 may represent an 8×8 portion of an image input to the neural network as a network input, or may represent an 8×8 portion of another input tensor, e.g., an input tensor corresponding to an output of a preceding layer of the neural network.

At part (a) of FIG. 9, an input tensor to the average pooling layer of the neural network has been zero-padded to generate a zero-padded input tensor. Instructions provided to the special-purpose hardware circuit may be used to generate control signals for controlling the special-purpose hardware circuit to zero-pad an input tensor. The zero-padding may be accomplished, for example, by providing the input tensor from the unified buffer 308 to the matrix computation unit 312, multiplying the input matrix with an identity matrix at the matrix computation unit 312, storing the output at the unified buffer 308, and then performing activation operations, e.g., by the vector computation unit 314, to write zeros in the appropriate places in the unified buffer 308 to generate the zero-padded input tensor. The resulting zero-padded input tensor is a 10×10 matrix having a first row of 10 zeros, 8 rows each having a first zero, 8 values from a row of the input tensor, and a second zero at the end of the row, and a final row of 10 zeros.

The zero-padded input tensor is convolved with a kernel that is a pooling kernel having the same size as a window specified for the average pooling layer of the neural network. Thus, for the example shown in FIG. 9, a 3×3 kernel composed of 1×1 identity matrices, i.e., ones, is convolved with the zero-padded input tensor to generate a summed output tensor. As shown, convolving the zero-padded input tensor with the pooling kernel generates the summed output tensor in which each element of the summed output tensor equals a sum of the corresponding element of the zero-padded input tensor and the 8 elements shown adjacent to the corresponding element of the zero-padded input tensor. Thus, the (0,0) element of the summed output tensor shown in FIG. 9 is equal to 8, i.e., the sum 0+0+0+0+0+1+0+3+4=8. A similar process may be performed to obtain each of the other elements of the summed output tensor, not shown in FIG. 9.

At part (b) of FIG. 9, element-wise multiplication of the summed output tensor and a masking tensor is performed. The masking tensor of FIG. 9 may be determined by first determining a least common denominator of the number of elements in the window specified for the average pooling layer of the neural network, and a numbers of elements of the input tensor that are used in generating each element of the summed output tensor. For the example of FIG. 9, the least common denominator will therefore be 36, i.e., the least common denominator of 9, i.e., the number of elements in the 3×3 window, 4, i.e., the number of elements of the input tensor summed to generate corner elements of the summed output tensor, and 6, i.e., the number of elements of the input tensor summed to generate edge elements of the summed output tensor.

Factors of the masking tensor are then determined based on the least common denominator and the number of elements of the input tensor summed to generate a corresponding element of the summed output tensor. The factors will allow for multiplication of an element of the summed output tensor by an inverse of the least common denominator and multiplication by the factor to result in a value that is the value of the summed output tensor element divided by the number of elements of the input tensor summed to generate the value of the summed output tensor. Thus, corner elements of the masking tensor are nines, i.e., since multiplication of a corner element of the summed output tensor by 9 and by 1/36 will result in the appropriate division of the corner element by 4. Edge elements of the masking tensor are sixes, i.e., since multiplication of an edge element of the summed output tensor by 6 and by 1/36 will result in the appropriate division of the corner element by 6. Other elements of the masking tensor are fours, i.e., since multiplication of a corresponding element of the summed output vector by 4 and by 1/36 will result in the appropriate division by 9.

Element-wise multiplication of the summed output tensor and the masking tensor results in the initial output tensor shown at part (b) of FIG. 9. For example, the summed output tensor may be provided to the matrix computation unit 312 from the unified buffer 308, and the masking tensor received or generated by the special-purpose hardware circuit may be provided to the matrix computation unit 312 from the dynamic memory 310. The matrix computation unit 312 performs element-wise multiplication to generate the initial output tensor. For example, element-wise multiplication of the corner element of the summed output tensor equal to 8 and the corresponding element of the masking tensor with a value of 9 results in the corner element of the initial output tensor with a value of 72. A similar process is performed to generate the other elements of the initial output tensor, which are not shown in FIG. 9 for simplicity.

At part (c) of FIG. 9, the initial output tensor is multiplied by a second masking tensor to generate an output tensor. The second masking tensor is a matrix having a same size as the initial output tensor and being composed of elements each equaling an inverse of the determined least common denominator, i.e., 1/36 or approximately 0.03. Element-wise multiplication of the initial output tensor and the second masking tensor is performed to generate the output tensor. For example, the initial output tensor may be stored at the unified buffer 308, and may be provided from the unified buffer 308 to the matrix computation unit 312. The second masking tensor may be stored at the dynamic memory 310 and may also be provided to the matrix computation unit 312, where element-wise multiplication is performed to generate the output tensor. For example, element-wise multiplication of the corner element of the initial output tensor with a value of 72 and the corresponding element of the second masking tensor with a value of 1/36 results in the corresponding corner element of the output tensor with a value of 2. The element-wise multiplication may be performed to generate the other elements of the output tensor, which are not shown in FIG. 9. Alternatively, a scalar multiplication function may be applied to the initial output tensor, e.g., by the vector computation unit 314. The resulting output tensor may be stored at the unified buffer 308.

Notably, the computations performed in FIG. 9 may limit the occurrence of quantization errors. By performing the element-wise multiplication shown at part (b) using integers, the calculations may be performed in the accumulators instead of the in the activations. Thus, where the accumulators have a higher resolution than the activations, the output of the part (b) computations can be maintained at a higher resolution. This increased resolution at the part (b) computations would consequently increase the accuracy of the output tensor resulting from the part (c) computations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing an average pooling neural network layer of a neural network on a hardware circuit, the method comprising:
   receiving a request to process the average pooling neural network layer on the hardware circuit; and
   in response, generating instructions that when executed by a hardware matrix computation unit of the hardware circuit, cause the hardware matrix computation unit to generate a layer output tensor that is equivalent to an output of the average pooling neural network layer by performing operations comprising:
   sending an input tensor to the average pooling neural network layer from a first portion of memory of the hardware circuit to the hardware matrix computation unit;
   sending a kernel from a second portion of memory of the hardware circuit to the hardware matrix computation unit, wherein the kernel has a size equal to a window of the average pooling neural network layer and is composed of elements that are each an identity matrix;
   performing, by the hardware matrix computation unit, a convolution of an input tensor to the average pooling neural network layer and the kernel with a size equal to the window of the average pooling neural network layer and composed of elements that are each an identity matrix to generate a first tensor, wherein at least part of the convolution is performed without having to pass data off the hardware circuit, thereby allowing for an inference of the average pooling neural network layer of the neural network to be determined without modifying the hardware circuit and avoiding processing delays resulting from performing part of the convolution off the hardware circuit;
   performing, by the hardware matrix computation unit, operations to cause each element of the first tensor to be divided by a number of elements in the window of the average pooling neural network layer to generate an initial output tensor; and
   rescaling, by the hardware matrix computation unit, edge and corner elements of the initial output tensor by performing element-wise multiplication of the initial output tensor with a rescaling tensor, wherein the rescaling tensor includes a first scaling factor for rescaling the edge elements and a second scaling factor for rescaling the corner elements.

2. The method of claim 1, wherein the first scaling factor is based on a number of elements of the input tensor that are multiplied with elements of the kernel in performing the convolution to generate an edge element of the first tensor, and the second scaling factor is based on a number of elements of the input tensor that are multiplied with elements of the kernel in performing the convolution to generate a corner element of the first tensor.

3. The method of claim 1, wherein performing the convolution of the input tensor and the kernel to generate the first tensor comprises:
   zero-padding the input tensor to generate a zero-padded input tensor; and
   performing a convolution of the zero-padded input tensor and the kernel to generate the first tensor.

4. The method of claim 1, wherein elements of the first tensor have a higher bit resolution than a bit resolution of the elements of the initial output tensor.

5. The method of claim 1, wherein performing the operations to cause each element of the first tensor to be divided by a number of elements in the window of the average pooling neural network layer to generate the initial output tensor comprises:
   generating a masking tensor, wherein a size of the masking tensor is determined by a size of the input tensor and wherein elements of the masking tensor are determined by a size of the window of the average pooling neural network layer; and
   performing element-wise multiplication of each element of the first tensor and each corresponding element of the masking tensor.

6. The method of claim 5, wherein generating the masking tensor comprises tiling one or more masking tensor fragments stored in memory.

7. The method of claim 5, wherein the first portion of the memory is a unified buffer of the hardware circuit and the masking tensor is stored at a dynamic memory of the hardware circuit, and wherein performing the operations to cause each element of the first tensor to be divided by a number of elements in the window of the average pooling neural network layer to generate the initial output tensor comprises:
   sending the masking tensor from the dynamic memory to the hardware matrix computation unit; and
   performing, by the hardware matrix computation unit, element-wise multiplication of the input tensor and the masking tensor to generate the first tensor.

8. The method of claim 1, wherein the first portion of the memory is a unified buffer of the hardware circuit and the second portion of the memory is a dynamic memory of the hardware circuit.

9. The method of claim 1, wherein performing the convolution of the input tensor and the kernel to generate the first tensor and performing the operations to cause each element of the first tensor to be divided by a number of elements in the window of the average pooling neural network layer to generate the initial output tensor are performed as fixed point operations.

10. A system comprising:
    a hardware circuit; and
    one or more storage devices storing instructions that are operable, when executed by the hardware circuit, to cause the hardware circuit to perform operations to generate a layer output tensor that is equivalent to an output of an average pooling neural network layer of a neural network, by performing operations comprising:
    sending an input tensor to the average pooling neural network layer from a first portion of memory of the hardware circuit to a hardware matrix computation unit of the hardware circuit;
    sending a kernel from a second portion of memory of the hardware circuit to the hardware matrix computation unit, wherein the kernel has a size equal to a window of the average pooling neural network layer and is composed of elements that are each an identity matrix;
    performing, by a hardware matrix computation unit of the hardware circuit, a convolution of an input tensor to the average pooling neural network layer and the kernel with a size equal to the window of the average pooling neural network layer and composed of elements that are each an identity matrix to generate a first tensor, wherein at least part of the convolution is performed without having to pass data off the hardware circuit, thereby allowing for an inference of the average pooling neural network layer of the neural network to be determined without modifying the hardware circuit and avoiding processing delays resulting from performing part of the convolution off the hardware circuit;

performing, by the hardware matrix computation unit, operations to cause each element of the first tensor to be divided by a number of elements in the window of the average pooling neural network layer to generate an initial output tensor; and rescaling, by the hardware matrix computation unit, edge and corner elements of the initial output tensor by performing element-wise multiplication of the initial output tensor with a rescaling tensor, wherein the rescaling tensor includes a first scaling factor for rescaling the edge elements and a second scaling factor for rescaling the corner elements.

11. The system of claim 10, wherein the first scaling factor is based on a number of elements of the input tensor that are multiplied with elements of the kernel in performing the convolution to generate an edge element of the first tensor, and the second scaling factor is based on a number of elements of the input tensor that are multiplied with elements of the kernel in performing the convolution to generate a corner element of the first tensor.

12. The system of claim 10, wherein performing the convolution of the input tensor and the kernel to generate the first tensor comprises:
zero-padding the input tensor to generate a zero-padded input tensor; and
performing a convolution of the zero-padded input tensor and the kernel to generate the first tensor.

13. The system of claim 10, wherein performing the operations to cause each element of the first tensor to be divided by a number of elements in the window of the average pooling neural network layer to generate the initial output tensor comprises:
generating a masking tensor, wherein a size of the masking tensor is determined by a size of the input tensor and wherein elements of the masking tensor are determined by a size of the window of the average pooling neural network layer; and
performing element-wise multiplication of each element of the first tensor and each corresponding element of the masking tensor.

14. The system of claim 13, wherein the first portion of the memory is a unified buffer of the hardware circuit and the masking tensor is stored at a dynamic memory of the hardware circuit, and wherein performing the operations to cause each element of the first tensor to be divided by a number of elements in the window of the average pooling neural network layer to generate the initial output tensor comprises:
sending the masking tensor from the dynamic memory to the hardware matrix computation unit; and
performing, by the hardware matrix computation unit, element-wise multiplication of the input tensor and the masking tensor to generate the first tensor.

15. The system of claim 10, wherein the first portion of the memory is at a unified buffer of the hardware circuit and the second portion of the memory is a dynamic memory of the hardware circuit.

16. A method for processing an average pooling neural network layer of a neural network on a hardware circuit, the method comprising:
receiving a request to process the average pooling neural network layer on the hardware circuit; and
in response, generating instructions that when executed by a hardware matrix computation unit of the hardware circuit, cause the hardware matrix computation unit to generate a layer output tensor that is equivalent to an output of the average pooling neural network layer by performing operations comprising:
sending an input tensor to the average pooling neural network layer from a first portion of memory of the hardware circuit to the hardware matrix computation unit;
sending a kernel from a second portion of memory of the hardware circuit to the hardware matrix computation unit, wherein the kernel has a size equal to a window of the average pooling neural network layer and is composed of elements that are each an identity matrix;
performing, by the hardware matrix computation unit, a convolution of an input tensor to the average pooling neural network layer and the kernel with a size equal to the window of the average pooling neural network layer and composed of elements that are each an identity matrix to generate a first tensor, wherein at least part of the convolution is performed without having to pass data off the hardware circuit, thereby allowing for an inference of the average pooling neural network layer of the neural network to be determined without modifying the hardware circuit and avoiding processing delays resulting from performing part of the convolution off the hardware circuit;
rescaling, by the hardware matrix computation unit, edge and corner elements of the first tensor by performing element-wise multiplication of the first tensor with a rescaling tensor to generate an initial output tensor; and
performing, by the hardware matrix computation unit, operations to cause each element of the initial output tensor to be divided by a number of elements in the window of the average pooling neural network layer to generate the layer output tensor, wherein the rescaling tensor includes a first scaling factor for rescaling the edge elements and a second scaling factor for rescaling the corner elements.

17. The method of claim 16, wherein the first scaling factor is based on a number of elements of the input tensor that are multiplied with elements of the kernel in performing the convolution to generate an edge element of the initial output tensor, and the second scaling factor is based on a number of elements of the input tensor that are multiplied with elements of the kernel in performing the convolution to generate a corner element of the initial output tensor.

* * * * *